(12) United States Patent
Shon et al.

(10) Patent No.: US 8,433,603 B1
(45) Date of Patent: Apr. 30, 2013

(54) MODIFYING AN ESTIMATE VALUE

(75) Inventors: Aaron Shon, Seattle, WA (US);
Matthew C. Cary, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/327,317

(22) Filed: Dec. 15, 2011

Related U.S. Application Data

(63) Continuation of application No. 12/166,122, filed on Jul. 1, 2008, now Pat. No. 8,140,382.

(51) Int. Cl.
*G06Q 10/00* (2012.01)
*G06Q 30/00* (2012.01)

(52) U.S. Cl.
USPC ....... 705/7.35; 705/7.11; 705/7.29; 705/14.4; 705/14.41; 705/14.45

(58) Field of Classification Search ......... 705/7.11–7.42
See application file for complete search history.

(56) References Cited

U.S. PATENT DOCUMENTS

| | | | |
|---|---|---|---|
| 7,158,959 B1 | 1/2007 | Chickering et al. | |
| 2003/0018501 A1* | 1/2003 | Shan | 705/7 |
| 2006/0004628 A1* | 1/2006 | Axe et al. | 705/14 |
| 2006/0122879 A1* | 6/2006 | O'Kelley | 705/14 |
| 2007/0143202 A1* | 6/2007 | Spangler | 705/37 |
| 2007/0174124 A1* | 7/2007 | Zagofsky et al. | 705/14 |
| 2007/0198350 A1* | 8/2007 | O'Kelley et al. | 705/14 |
| 2008/0010270 A1 | 1/2008 | Gross | |
| 2008/0154717 A1 | 6/2008 | Saifee et al. | |
| 2008/0263460 A1* | 10/2008 | Altberg et al. | 715/757 |
| 2008/0270154 A1 | 10/2008 | Klots et al. | |
| 2009/0106103 A1 | 4/2009 | Milana et al. | |

OTHER PUBLICATIONS

G2006: Gui, 'Bayesian Reference Inference on the Ratio of Two Poisson Rates', Masters Thesis, East Tennessee State University, May 2006, 52 pages.*
K1960: Rudolph Emil Kalman, 'A New Approach to Linear Filtering and Prediction Problems', Transactions of the ASME—Journal of Basic Engineering, vol. 82, Series D, pp. 35-45, 1960.*
'Prior Probablity' {online], Wikipedia, [retrieved on Jul. 6, 2009], [published on Sep. 27, 2007]. Retrieved from the internet: http://web.archive.org/web/20070927185502/http://en.wikipedia.org/wiki/Prior_probability.*
Zwick, Rebecca and Thayer, Dorothy T., 'Application of an Empirical Bayes Enhancement of Mantel-Haenszel Differential Item Functioning Analysis to a Computerized Adaptive Test', May 16, 2008, pp. 56-76.*
'Prior Probability' {online], Wikipedia, [retrieved on Jul. 6, 2009], [published on Sep. 27, 2007]. Retrieved from the internet: http://web.archive.org/web/20070927185502/http://en.wikipedia.org/wiki/Prior_probablitity.

* cited by examiner

*Primary Examiner* — Leland Marcus
*Assistant Examiner* — Richard Scheunemann
(74) *Attorney, Agent, or Firm* — Fish & Richardson P.C.

(57) ABSTRACT

Among other disclosed subject matter, a computer-implemented method for modifying an estimate value includes determining a first estimate value based on a plurality of values relating to a first entity. The method includes determining a second estimate value for at least one second entity identified as a peer of the first entity. The method includes modifying the first estimate value using the second estimate value.

19 Claims, 4 Drawing Sheets

# MODIFYING AN ESTIMATE VALUE

CROSS-REFERENCE TO RELATED APPLICATION

This application is a continuation of U.S. patent application Ser. No. 12/166,122, filed on Jul. 1, 2008, which is herein incorporated by reference in its entirety.

TECHNICAL FIELD

This document relates to information processing.

BACKGROUND

Advertiser or others who provide content for publishing may be interested in events such as conversions that occur relative to the publication of the advertisement or other content by a particular publisher. Conversions can include, for example, successful sales as a result of a user clicking on an advertisement. For example, the advertiser may wish to know how may conversions occur for every thousand times, or hundred thousand times, an advertisement or other content is displayed. Such a statistic can be referred to as a conversion rate.

Advertisers or other content providers may be interested in comparing the conversion rate for a particular publisher to a benchmark conversion rate. For example, the conversion rate received by the advertiser and/or others on an advertisement-enhanced page such as google.com is sometimes considered a relevant measure.

SUMMARY

The invention relates to modifying an estimate value.

In a first aspect, a computer-implemented method for modifying an estimate value includes determining a first estimate value based on a plurality of values relating to a first entity. The method includes determining a second estimate value for at least one second entity identified as a peer of the first entity. The method includes modifying the first estimate value using the second estimate value.

Implementations can include any, all or none of the following features. The first estimate value can include a first mean of a ratio, and the second estimate value can include a second mean of the ratio. The method can further include determining a precision for each of a plurality of second entities determined as peers of the first entity, each of the plurality of second entities associated with a plurality of ratio values having a mean; wherein the second mean is determined using the means of the pluralities of ratio values and the precisions. Modifying the first mean using the second mean can include using a standard deviation of the plurality of ratio values and a standard deviation of the first mean. The first estimate value can further include a first standard deviation of the first mean, and the second estimate value can further include a second standard deviation of the second mean. A plurality of second entities can be determined as peers of the first entity, each of the plurality of second entities associated with a plurality of ratio values having a mean, and the second standard deviation can be determined using standard deviations for the pluralities of ratio values. The method can further include determining a precision for each of the plurality of second entities; wherein the second standard deviation is determined using the second mean, means of the pluralities of ratio values, and the precisions. Modifying the first standard deviation can include using a standard deviation of the plurality of ratio values. Determining the first estimate value and the second estimate value can include using a Mantel-Haenszel estimator. The second entity can be identified as a peer of the first entity based on at least one criterion selected from the group consisting of: the second entity is active in a common area of enterprise as the first entity; the second entity has a similar size as the first entity; the second entity has been associated with an organization approximately as long as the first entity, wherein it is the organization that modifies the estimate value; the second entity and the first entity being publishers that publish content from advertisers, and the second entity operating with advertisers having a similar quality as those of the first entity; the second entity and the first entity publishing pages that have an equivalent ranking according to a ranking function; and combinations thereof. The method can further include identifying a peer entity group including a plurality of second entities as peers of the first entity; and selecting a subset of the peer entity group, including the at least one second entity to be used for use in determining the second estimate value. The method can further include determining that future observations of the first estimate value are associated with a high uncertainty level; and the subset can be selected as those of the plurality of second entities associated with higher standard deviations than a remainder of the peer entity group. The method can further include determining that future observations of the first estimate value are associated with a low uncertainty level; and the subset can be selected as those of the plurality of second entities associated with lower standard deviations than a remainder of the peer entity group. The method can further include identifying a first publisher as the first entity, wherein the first estimate value is a conversion rate ratio for the first publisher; identifying a plurality of values for a publisher conversion rate of the first publisher as the plurality of values, the conversion rate ratio defined as a ratio between: i) the publisher conversion rate; and ii) a reference conversion rate; and identifying a plurality of second publishers, including the second entity, that are peers of the first publisher; wherein the conversion rate ratio is modified using information associated with the plurality of second publishers. The method can further include communicating the modified conversion rate ratio to at least one advertiser, the modified conversion rate ratio configured for use in determining whether to bid for advertising space on a page published by the first publisher. The method can further include adjusting a bid from an advertiser using the modified conversion rate ratio, the bid submitted for advertising space on a page published by the first publisher. The method can further include generating a recommendation regarding the first publisher using the modified conversion rate ratio. The method can further include evaluating the first publisher using the modified conversion rate ratio.

In a second aspect, a computer-implemented method for determining a publisher's mean conversion rate ratio and a standard deviation ratio for the mean conversion rate ratio includes identifying a first publisher whose conversion rate ratio is to be estimated, the conversion rate ratio defined as a ratio between: i) a publisher conversion rate that a first advertiser obtains for at least one advertisement placed on a page published by the first publisher; and ii) a reference conversion rate that the first advertiser obtains on one or more reference page(s). The method includes obtaining a value for the reference conversion rate and a plurality of values for the publisher conversion rate. The method includes determining a first mean and a first standard deviation using the value for the reference conversion rate and the plurality of values for the publisher conversion rate, the first mean and the first standard deviation relating to the first publisher. The method includes identifying a plurality of second publishers that are peers of the first publisher. The method includes obtaining, for each of the plurality of second publishers, values for the reference conversion rate and pluralities of values for the publisher conversion rate. The method includes determining, for each of the plurality of second publishers, a second mean and a second standard deviation using the corresponding values for the reference conversion rate and the pluralities of values for the publisher conversion rate. The method includes determining a precision for each of the plurality of second publishers using $$p\_i \leftarrow \frac{1}{s\_i^2}$$

wherein
p_i=the precision for second publisher i among the plurality of second publishers; and
s_i=the second standard deviation for the second publisher i. The method includes dividing the plurality of second publishers into a subset and a remainder based on a threshold value for the second standard deviations, the subset relating to those of the plurality of second publishers whose second standard deviations fall above the threshold value. The method includes selecting an uncertainty level as one of i) high uncertainty and ii) low uncertainty as characterizing future observations of the publisher conversion rate ratio. The method includes selecting one of the subset and the remainder as a publisher peer group based on the selected uncertainty. The method includes determining, using the publisher peer group, a peer group mean and a peer group standard deviation using:

$$m \leftarrow \sum_{x\_k} \frac{m\_k * p\_k}{\sum_{x\_k} p\_k}$$

wherein
m=the peer group mean;
x_k=all tuples of second means and second standard deviations in the publisher peer group;
m_k=the second mean for publisher k;
p_k=the precision for publisher k;
s=the peer group standard deviation. The method includes determining a modified first mean and a modified first standard deviation for the first publisher using $$m'' \leftarrow \frac{m * p}{p + p'} + \frac{m' * p'}{p + p'}$$

$$s'' \leftarrow \frac{(s^2 * s'^2)}{(s^2 + s'^2)}$$

wherein
m''=the modified first mean;

$$p \leftarrow \frac{1}{s^2};$$

$$p' \leftarrow \frac{1}{s'^2};$$

s''=the modified first standard deviation;
s'=the first standard deviation; and
m'=the first mean.
Implementations can include any, all or none of the following features. The peer group standard deviation can be determined using $$s \leftarrow \sqrt{\frac{\prod_{x\_k} s\_k^2}{\sum_{x\_k} s\_k^2}}$$

wherein
s=the peer group standard deviation; and
s_k=the second standard deviation for publisher k. The peer group standard deviation can be determined using $$s \leftarrow \sqrt{\frac{\sum_{x\_k} p\_k * (m - m\_k)^2}{\sum_{x\_k} p\_k}}$$

wherein
s=the peer group standard deviation.
The details of one or more embodiments are set forth in the accompanying drawings and the description below. Other features and advantages will be apparent from the description and drawings, and from the claims.

DETAILED DESCRIPTION

Figure 1:
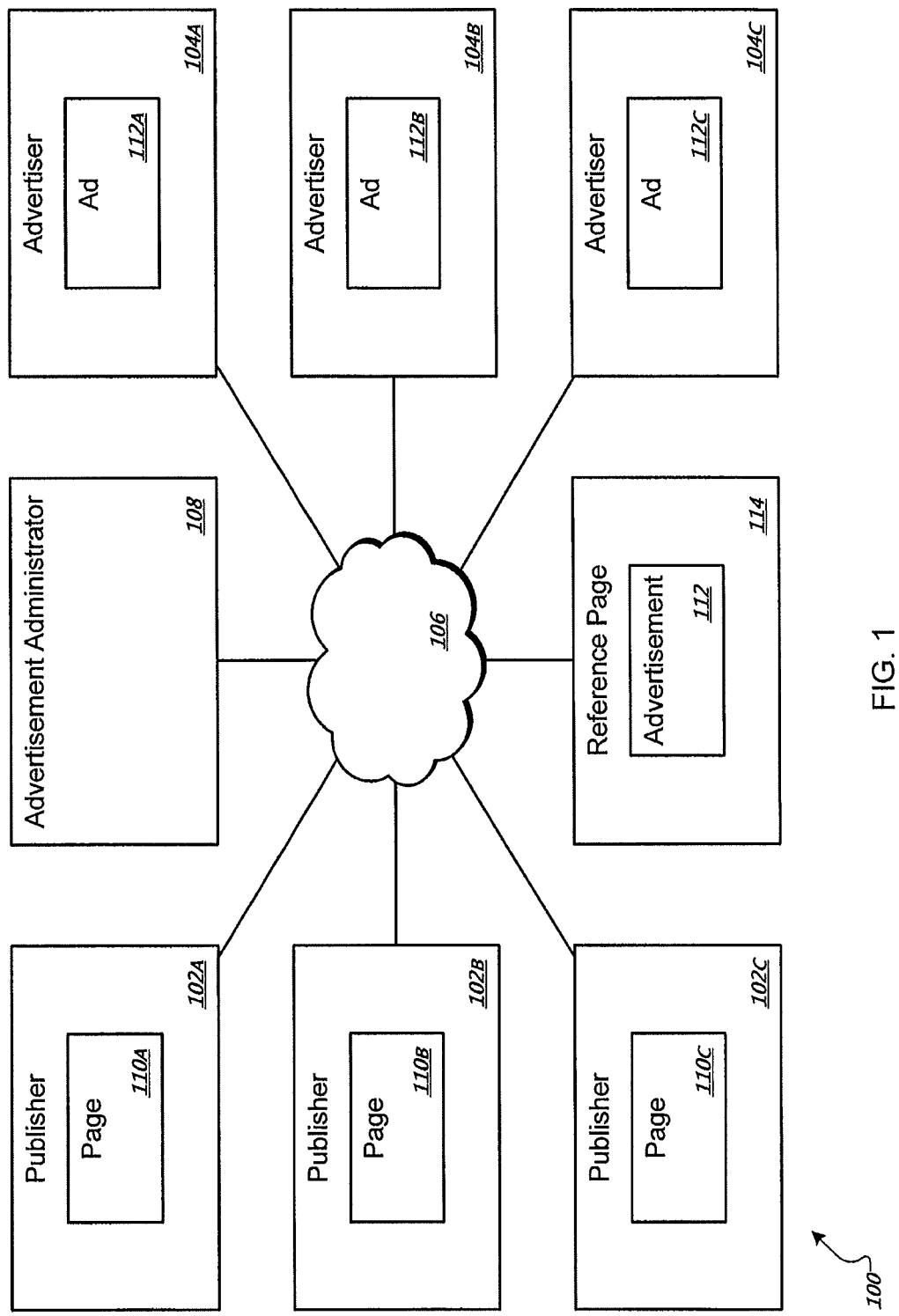
FIG. 1 shows an example of a system that can modify an estimate value.

FIG. 1 shows an example of a system that can modify an estimate value. Here, a system 100 includes a plurality of publishers 102 and a plurality of content providers 104, such as advertisers, who seek to provide content for publication by at least one of the publishers 102. The publishers 102 and the advertisers 104 can be connected by any kind of network 106, such as an intranet or the internet. Below will be described examples of how one or more values relating to the publisher(s) 102 can be estimated and/or modified. In other implementations, other architectures can be used.
The system 100 here includes an advertisement administrator system 108. In some implementations, the system 108 administrates the distribution of content such as advertisements between the publishers 102 and the advertisers 104 and/or any other entity. For example, the system 108 can receive bids from the advertisers 104 for publishing content on any or all of pages 110 controlled by the publishers 102. The system 108 can choose among received bids, select a winning advertiser, and arrange so that a corresponding advertisement 112 or other content from the winning advertiser is submitted to the publisher 102 at issue, for publication on the page(s) 110. Such advertisement administration can be conducted using a fixed-price system, an auction mechanism, or any other form of transaction, to name a few examples. As another example, the advertisement administration system 108 can provide information to the advertiser(s) to assist in choosing one or more of the publishers 102 when submitting a bid. For example, the publisher 102A may be an online news medium published by a newspaper corporation (e.g., an online newspaper), and the advertiser(s) 104 may wish to place their advertisement(s) 112 on one or more pages of the online newspaper that will be read by viewers.

The advertiser(s) 104 may also or instead choose to have their content (e.g., the ad 112) published elsewhere than on the pages 110, for example on a reference page 114. In some implementations, the reference page 114 provides a search engine function that is available to users of the page 114. For example, the reference page 114 can perform searches for keywords and/or other search criteria specified by the user, and thereafter present search results for the user to review. The advertisement(s) 112 can be presented at any point of such operations, for example in connection with displaying the search results. In some implementations, the reference page 114 and the advertisement administrator 108 can be controlled by the same organization.

The advertisement(s) 112 or other content can be displayed on the page(s) 110 in any form. In some implementations, the advertisement 112 includes a hyperlink on which the viewer of the page 110 can click. The ultimate landing page for such a navigation may be a page or other network resource controlled by the corresponding advertiser 104, such as the home page or an online shopping page for that advertiser 104.

Some or all of the advertisers 104 may wish to determine whether there occurs any event(s) relating to the publication of its advertisement(s) 112 that is significant or otherwise of interest to the advertiser. In some implementations, such events can be referred to as conversions. Conversions can include, but are not limited to, that a viewer who clicks on the advertisement later: proceeds to purchase a product from the advertiser; makes a donation to the advertiser; registers with the advertiser; or accepts a proposition made by the advertiser; to name just a few examples. In some implementations, other event(s) can be used in lieu of, or together with, any of the conversions mentioned above.

In some implementations the advertiser(s) 104 may want to track conversions that occur relative to the advertisement (or other content) displayed on the page(s) 110. For example, the advertiser may wish to know how may conversions occur for every thousand times, or hundred thousand times, the advertisement 112 or other content is displayed. The mentioned numbers are examples and other numbers can be used. This statistic can be determined per publisher; thus, specifically for the publisher 102A, for example. In some implementations, this statistic can be considered a conversion rate for that publisher 102A and can be referred to as $CvR\_p$.

Similarly, the advertiser(s) 104 whose advertisements 112 or other content are shown on the reference page 114 may wish to track events relating to this publication. Analogously to the above description, in some implementations a conversion rate for a particular advertiser can be defined regarding the reference page 114 and can be referred to as $CvR\_reference$.

To some extent the variable $CvR\_p$ can depend on the particular publisher 112 and/or on the page 110, such as on how prominently the advertisement or other content is featured and/or on whether the publisher is known for presenting relevant and useful advertisements, to name just a few examples. Another relevant measure, however, can be a ratio between the two rates described above, defined as $$CvR\_p/CvR\_reference$$

In some implementations, this ratio can be considered to indicate how the individual publisher 102 is performing in terms of generating conversions for the advertiser 104, relative to how much conversions the advertiser 104 receives at the reference page. For example, the ratio can be referred to as a conversion rate ratio. Sometimes, the data used to calculate a conversion rate ratio can be noisy and lead to uncertain results. Using techniques of some implementations described herein, however, such information can be processed in an attempt to produce more reliable information.

Figure 2:
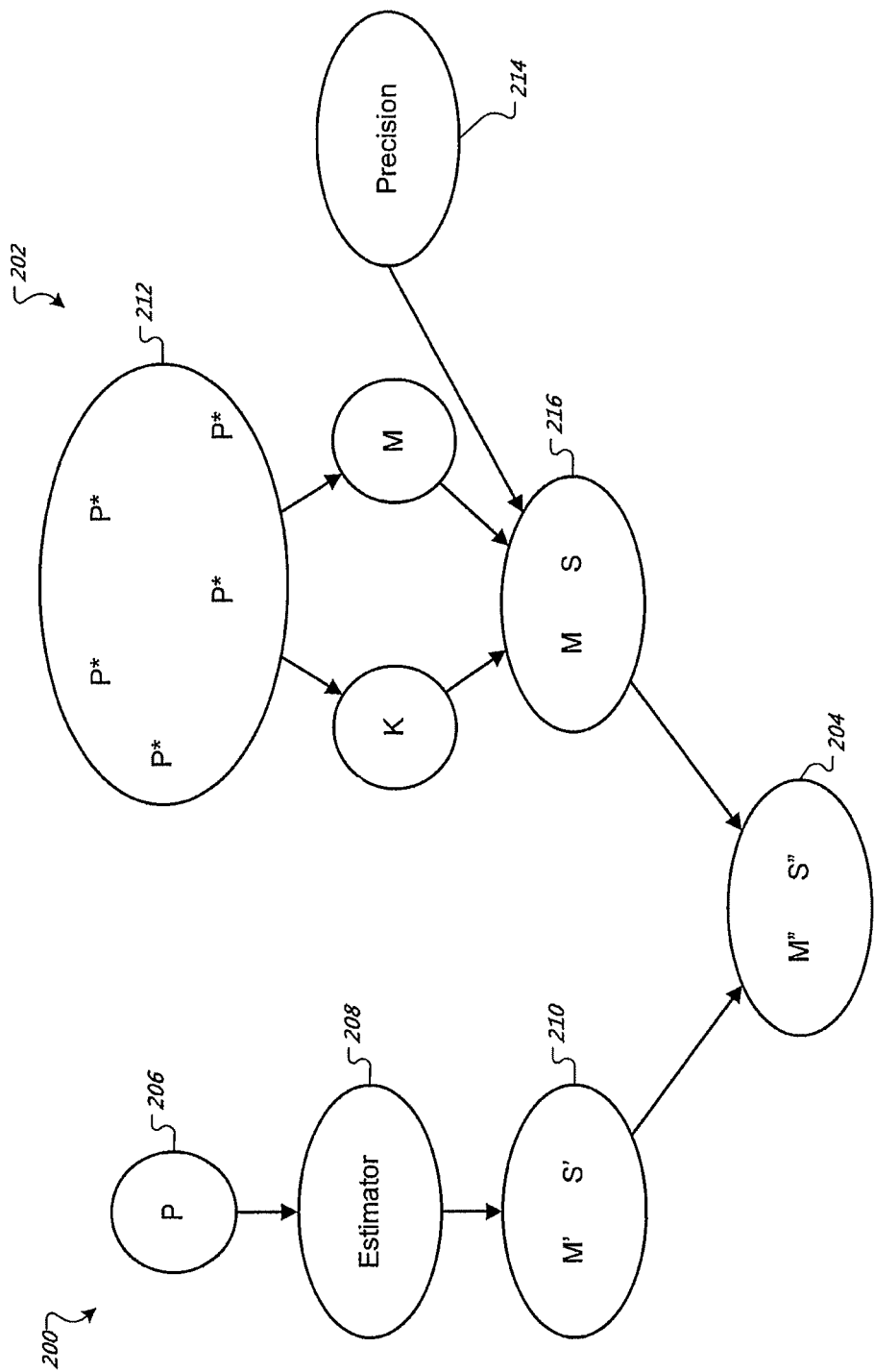
FIG. 2 schematically shows an example of modifying an estimate value.

FIG. 2 schematically shows an example of modifying an estimate value. Briefly, it will be described that information relating to an individual entity, such as a publisher, can be processed in a first branch 200; that information from one or more peer entities, such as a peer publisher, can be processed in a second branch 202, and that values from the branches 200 and 202 can be used to provide an estimation 204 regarding the individual entity, in an attempt to reach a better estimate. Operations can be performed in a different order than they are described; as another example, one or more additional operations can be performed.

A publisher P, such as the publisher 102A (FIG. 1), can be a starting point. Assume in this example that the conversion rate ratio (i.e., $CvR\_p/CvR\_reference$) for that publisher P relative to one or more advertisers is to be determined. Information 206 is available relating to the publisher P. The information 206 can include values for calculating $CvR\_p$ and for calculating $CvR\_reference$. For example, the information 206 can include the number of the advertisements 112 or other content from the advertiser 104A that the publisher P has published, the number of conversions that the advertiser 104A has received based on the publications, to name a few examples. This information can be distributed over time if the publisher P has been displaying the advertisement(s) during a time period. Thus, a plurality of values for the publisher conversion rate can be obtained. As another example, the information 206 can include values for calculating $CvR\_reference$, such as the number of the advertisements 112 or other content from the advertiser 104A that the reference page 114 has published, and the number of conversions that the advertiser 104A has received based on the publications on the reference page 114.

Some or all of the information 206 is forwarded to an estimator 208. For example, the estimator can process the information 206 to determine one or more statistical aspects of it, including, but not limited to, a mean and/or a standard deviation.

In some implementations, the estimator is a Mantel-Haenszel estimator, but other estimators can be used. Other estimators that could be used include Woolfs estimator, or a relative ratio of the two rates that does not weight different advertisers' contributions to the overall publisher CvR by the relative amounts of data available to each advertiser.

The estimator 208 can provide at least one first estimate value 210 relating to the publisher P. In this example, the first estimate value 210 includes a mean (here referred to as m') and a standard deviation (here referred to as s') based on at least the information 206. That is, they indicate, respectively, subject to the noise mentioned above, the mean conversion rate ratio for the publisher P and the certainty or uncertainty of the estimated mean. Thus, in some implementations m' and s' can be the results of the first branch 200.

In the second branch 202, moreover, peer information 212 can be used. For example, while the information 206, and as a result the value 210, can be sparse and/or considered noisy in part or its entirety, the peer information 212 can be used in an attempt to improve the accuracy and/or reduce the noisiness and/or uncertainty.

The peer information 212 can relate to one or more peers of the publisher P. Here, for example, the peer information 212 includes information relating to a plurality of publishers P*. Thus, the peer information 212 can be provided by identifying a plurality of publishers P* that are peers of the publisher P, and obtaining relevant data for each of the plurality of publishers P*. Such data can include values for conversion rates in analogy with the discussion above. For example, data can be obtained from which a publisher conversion rate and/or a reference conversion rate can be determined for each of the publishers P*.

In some implementations, statistics corresponding to the estimate value(s) 210 can be determined for each of the publishers P*. For example, based at least on the peer information 212, a mean and/or a standard deviation can be determined for each of the publishers P*. As noted in the above example, such a mean and/or standard deviation can relate to a corresponding conversion rate ratio relating to each individual one of the publishers P*.

Based at least on the information 212, a precision calculation 214 can be performed for each of the publishers P* in some implementations. For example, the precision for an ith publisher of the publishers P* can be determined as follows:

$$p\_i \leftarrow \frac{1}{s\_i^2}$$

wherein
p_i=the precision; and
s_i=the standard deviation for the publisher i.

Other ways of calculating precision can be used, such as taking higher-order moments of s_i (powers of s_i), other nonlinear functions of s_i, or measuring the overall uncertainty in the distribution of values for publisher i.

The information 212 can be divided into at least one subset. For example, the information 212 can be divided into a subset K and a remainder M. In some implementations the dividing can be based on a threshold value for standard deviations relating to the publishers P*. For example, the subset K can include those of the publishers P* whose standard deviations are above the threshold value, and the remainder M can include those of the publishers P* whose standard deviations are at or below the threshold value. In some implementations, having a low standard deviation can indicate that the publisher is a seasoned participant in the advertisement operations managed by the advertisement administrator 108. That is, in such examples the advertiser may have a steady practice of displaying advertisements and produces approximately stable conversion rates over time. In contrast, having a high standard deviation can indicate that the publisher is not a seasoned and/or established displayer of advertisements, because the conversion rates may fluctuate more.

At least one of K and M can be used for the calculation in the second branch 202. In some implementations, one of K and M is selected based on a perceived certainty or uncertainty of the information 206 and/or the estimate value 210. For example, if the publisher P whose statistics are being estimated is expected to perform more as an unestablished participant than as a seasoned one, then the subset K (which here is associated with relatively higher standard deviations) can be chosen. In contrast, and as another example, if the publisher P is expected to perform more as a seasoned participant than as an unestablished one, then the subset M can be chosen. Thus, in some implementations an uncertainty level of either i) high uncertainty or ii) low uncertainty can be chosen for the publisher P as characterizing future observations of the publisher's conversion rate ratio. Based on such a selected uncertainty, then, one of the subset K and the remainder M can be selected as a publisher peer group An estimate value 216 for the publisher peer group can be determined based on the information from the publisher peer group. In some implementations, the estimate value 216 can include one or more statistics for a conversion rate ratio. For example, a peer group mean m and a peer group standard deviation s can be determined using:

$$m \leftarrow \sum_{x\_k} \frac{m\_k * p\_k}{\sum_{x\_k} p\_k} \text{ and } s \leftarrow \sqrt{\frac{\prod_{x\_k} s\_k^2}{\sum_{x\_k} s\_k^2}}$$

wherein
x_k=all tuples of means and standard deviations in the publisher peer group;
m_k=the mean for publisher k;
p_k=the precision for publisher k;
s_k=the standard deviation for publisher k.

For example, m and s can be considered the estimated mean and standard deviation of a prior. The mean and standard deviation of the prior may be derived either empirically (from preexisting data), or from prior expertise or belief added by designers of the system.

As another example, the peer group standard deviation s can be determined using:

$$s \leftarrow \sqrt{\frac{\sum_{x\_k} p\_k * (m - m\_k)^2}{\sum_{x\_k} p\_k}}$$

wherein p_k, m and m_k can be obtained substantially as described above. In some implementations, the just-mentioned approach can be used when the size of K grows large (e.g., above some threshold u).

Other ways of calculating a statistic for the publisher peer group can be used.

The estimation 204 can now be generated based at least on the estimate value(s) 210 and the estimate value(s) 216. In some implementations, the estimation 204 comprises a modification of the estimate value(s) 210, using the estimate value(s) 216, from the mean m' and standard deviation s', to a modified mean m" and a modified standard deviation s". For example, m" and s" can be generated using:

$$m'' \leftarrow \frac{m * p}{p + p'} + \frac{m' * p'}{p + p'}$$

$$s'' \leftarrow \frac{(s^2 * s'^2)}{(s^2 + s'^2)} \text{ wherein } p \leftarrow \frac{1}{s^2} \text{ and } p' \leftarrow \frac{1}{s'^2}.$$

Figure 3:
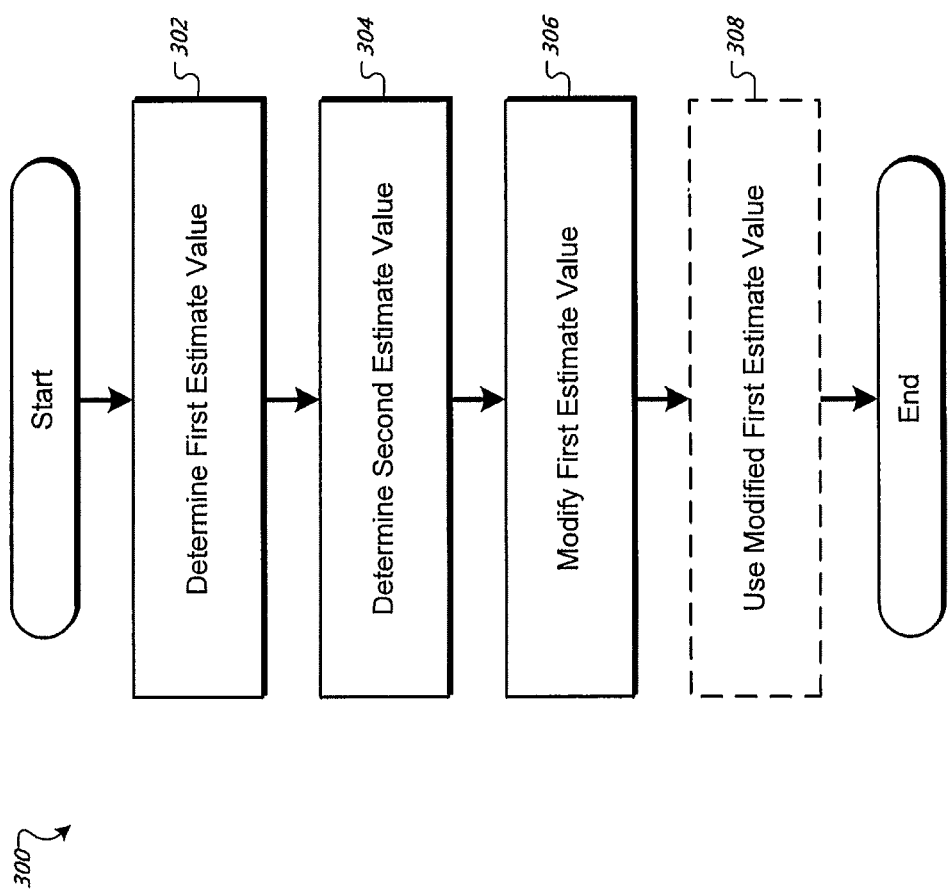
FIG. 3 shows a flow chart of an example of operations that can be performed.

For example, m" and s" can be considered the mean and standard deviation of a normally distributed posterior estimate. Other ways of modifying a statistic for the publisher using information from a publisher peer group can be used FIG. 3 shows a flow chart of an example of operations 300 that can be performed. For example, the operations 300 can be performed in a computer system by a processor executing instructions in a computer-readable medium. More or fewer steps can be performed, and/or in a different order.

Step 302 involves determining a first estimate value based on a plurality of values relating to a first entity. For example, m' and s' relating to the publisher P can be determined, such as in the system 100. In the statistics literature, this first estimate value is sometimes called a likelihood term or a likelihood distribution.

Step 304 involves determining a second estimate value for at least one second entity identified as a peer of the first entity. For example, m and s relating to the publisher peer group K and/or M can be determined, such as in the system 100. In the statistics literature, this second estimate value is sometimes called a prior term or a prior distribution.

Step 306 involves modifying the first estimate value using the second estimate value. For example, m' and s' can be modified to m" and s". In the statistics literature, this second estimate value is sometimes called a posterior term or a posterior distribution.

In optional step 308, one or more estimate values can be used. In some implementations, the of the conversion rate ratio for the publisher P can be used for one or more purposes relating to the publisher(s) 102 and/or the advertisers(s) 104. For example, the estimate value can be communicated to at least one advertiser for use in determining whether to bid for advertising space on a page published by the publisher. As another example, the estimate value can be used to adjust a bid from an advertiser submitted for advertising space on a page published by the publisher. As another example, the estimate value can be used to generate a recommendation regarding the publisher. As another example, the estimate value can be used to evaluate the publisher. Some implementations can involve other ways of using an estimate value.

Figure 4:
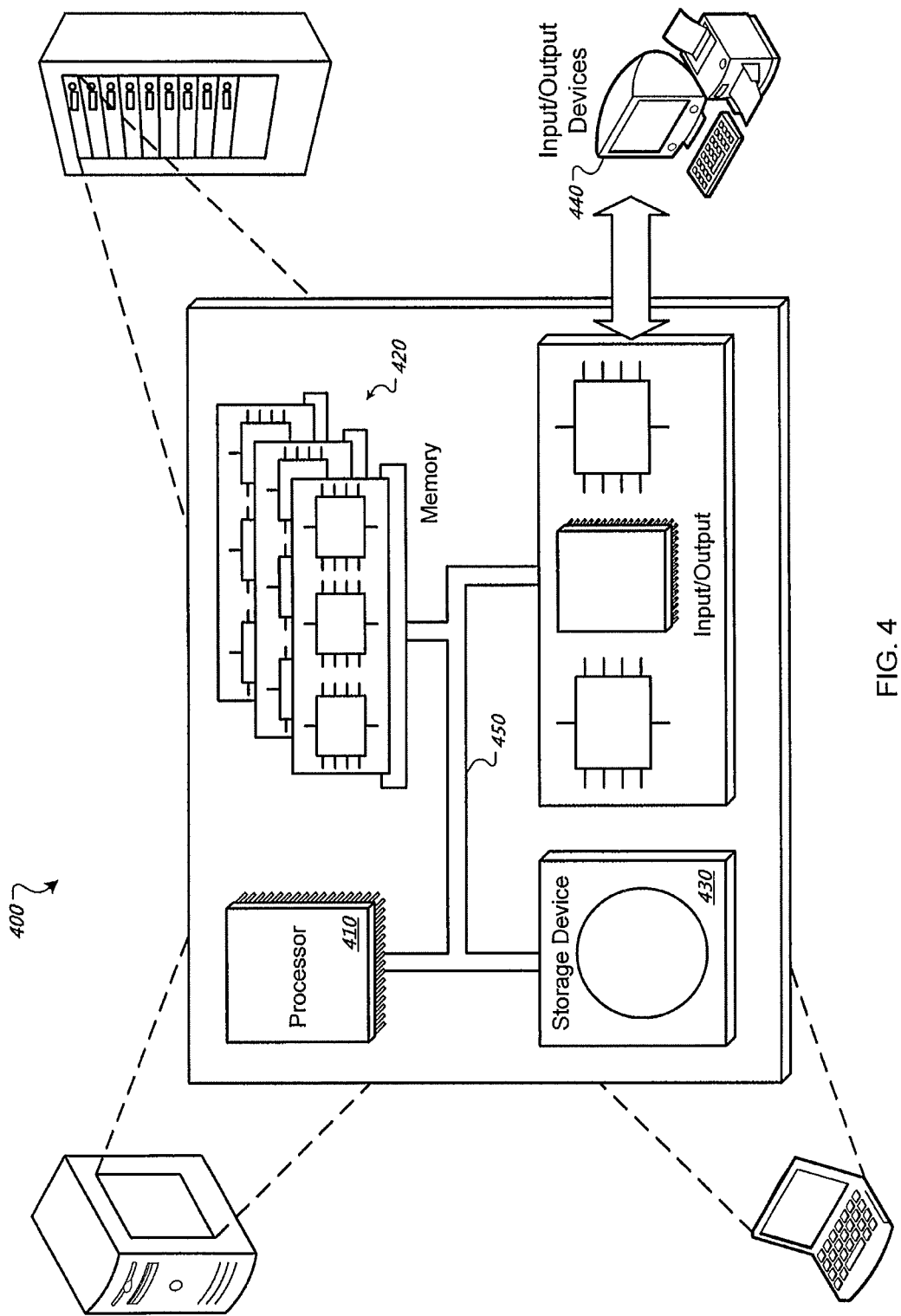
FIG. 4 is a block diagram of a computing system that can be used in connection with computer-implemented methods described in this document.
Like reference symbols in the various drawings indicate like elements.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer implemented method comprising:
   determining, using one or more processors, a precision value and an estimate value for a conversion rate ratio for a publisher, wherein the estimate value for the publisher includes a mean (m') and a standard deviation (s');
   determining, using the one or more processors, a precision value and estimate value for a conversion rate ratio for a group of peers of the publisher, wherein the estimate value for the group of peers of the publisher includes a mean (m) and a standard deviation (s);
   generating, using the one or more processors, a modified estimate value for the conversion rate ratio of the publisher using the precision value of the publisher, the precision value for the group of peers of the publisher, and the estimate value for the conversion rate ratio for the group of peers of the publisher,
     wherein the modified estimated value includes a modified mean (m") and a modified standard deviation (s"),
     wherein generating the modified estimate value comprises generating the modified mean (m") by determining a weighted average of (i) the mean (m') for the conversion rate ratio for the publisher, and (ii) the mean for the conversion rate ratio for the group of the peers of the publisher (m), and
     wherein the weighted average is weighted based on (i) the precision value for the publisher, and (ii) the precision value for the group of peers of the publisher; and
   communicating, using the one or more processors, the modified estimate value for the conversion rate ratio for the publisher to one or more advertisers.

2. The computer implemented method of claim 1, wherein the mean (m') of the estimate value for the publisher is a first mean of a first ratio, and wherein the mean (m) of the estimate value for the group of peers of the publisher is a second mean of a second ratio.

3. The computer implemented method of claim 2, wherein generating the modified standard deviation (s") comprises using a standard deviation (s') of the first mean of the first ratio and a standard deviation (s) of the second mean of a second ratio.

4. The computer implemented method of claim 1, wherein determining the estimate value for the publisher and the estimate value for the group of peers of the publisher comprises using a Mantel-Haenszel estimator.

5. The computer implemented method of claim 1, further comprising selecting the group of peers of the publisher based on at least one criterion selected from the group consisting of:
   the group of peers active in a common area of an enterprise as the publisher;
   the group of peers having a size within a threshold value of that of the publisher;
   the group of peers having been associated with an organization within a threshold value of the time of association of the publisher, wherein it is the organization that modifies the estimate value;
   the group of peers and the publisher that publish content from advertisers and the group of peers operating with advertisers having a quality in a same category as those of the publisher; and
   the group of peers and the publisher that publish pages that have an equivalent ranking according to a ranking.

6. The computer implemented method of claim 1, further comprising:
   selecting a subset of the group of peers of the publisher to be used for determining the estimate value for the group of peers of the publisher, wherein the peers in the subset are chosen based on the standard deviations corresponding to the peers in the subset.

7. The computer implemented method of claim 6, further comprising:
   determining that future observations of the estimate values for a publisher are associated with a high uncertainty level;
   wherein the subset is selected as those of the plurality of the group of peers of the publisher associated with standard deviations that satisfy a threshold value.

8. The computer implemented method of claim 6, further comprising:
   determining that future observations of the estimate values for a publisher are associated with a low uncertainty level;
   wherein the subset is selected as those of the plurality of the group of peers of the publisher associated with standard deviations that do not satisfy a threshold value.

9. The computer implemented method of claim 1, further comprising:
   communicating the modified conversion rate ratio to at least one advertiser, the modified conversion rate ratio configured for use in determining whether to bid for advertising space on a page published by the first publisher.

10. The computer implemented method of claim 9, further comprising:
    adjusting a bid from an advertiser using the modified conversion rate ratio, the bid submitted for advertising space on a page published by the publisher.

11. The computer implemented method of claim 10, further comprising:
    generating a recommendation regarding the publisher using the modified conversion rate ratio.

12. The computer implemented method of claim 11, further comprising:
    evaluating the publisher using the modified conversion rate ratio.

13. A computer apparatus comprising:
    one or more processors; and
    a non-transitory memory containing instructions that, when executed by the one or more processors, cause the one or more processors to perform a set of steps comprising:
    determining a precision value and an estimate value for a conversion rate ratio for a publisher, wherein the estimate value for the publisher includes a mean (m') and a standard deviation (s');
    determining a precision value and estimate value for a conversion rate ratio for a group of peers of the publisher, wherein the estimate value for the group of peers of the publisher includes a mean (m) and a standard deviation (s);

generating a modified estimate value for the conversion rate ratio of the publisher using the precision value of the publisher, the precision value for the group of peers of the publisher, and the estimate value for the conversion rate ratio for the group of peers of the publisher, wherein the modified estimated value includes a modified mean (m") and a modified standard deviation (s"), wherein generating the modified estimate value comprises generating the modified mean (m") by determining a weighted average of (i) the mean (m') for the conversion rate ratio for the publisher, and (ii) the mean for the conversion rate ratio for the group of the peers of the publisher (m), and wherein the weighted average is weighted based on (i) the precision value for the publisher, and (ii) the precision value for the group of peers of the publisher; and communicating the modified estimate value for the conversion rate ratio for the publisher to one or more advertisers.

14. The computer apparatus of claim 13, wherein the mean (m') of the estimate value for the publisher is a first mean of a first ratio, and wherein the mean (m) of the estimate value for the group of peers of the publisher is a second mean of a second ratio.

15. The computer apparatus of claim 14, wherein generating the modified standard deviation (s") comprises using a standard deviation (s') of the first mean of the first ratio and a standard deviation (s) of the second mean of a second ratio.

16. The computer apparatus of claim 13, wherein the steps further comprise selecting the group of peers of the publisher based on at least one criterion selected from the group consisting of:

the group of peers active in a common area of an enterprise as the publisher;

the group of peers having a size within a threshold value of that of the publisher;

the group of peers having been associated with an organization within a threshold value of the time of association of the publisher, wherein it is the organization that modifies the estimate value;

the group of peers and the publisher that publish content from advertisers and the group of peers operating with advertisers having a quality in a same category as those of the publisher; and the group of peers and the publisher that publish pages that have an equivalent ranking according to a ranking.

17. A computer system comprising:

one or more processors; and a non-transitory memory, electrically connected to the one or more processors, containing instructions that, when executed by the one or more processors, cause the one or more processors to perform a set of steps comprising:

determining a precision value and an estimate value for a conversion rate ratio for a publisher, wherein the estimate value for the publisher includes a mean (m') and a standard deviation (s');

determining a precision value and estimate value for a conversion rate ratio for a group of peers of the publisher, wherein the estimate value for the group of peers of the publisher includes a mean (m) and a standard deviation (s);

generating a modified estimate value for the conversion rate ratio of the publisher using the precision value of the publisher, the precision value for the group of peers of the publisher, and the estimate value for the conversion rate ratio for the group of peers of the publisher, wherein the modified estimated value includes a modified mean (m") and a modified standard deviation (s"), wherein generating the modified estimate value comprises generating the modified mean (m") by determining a weighted average of (i) the mean (m') for the conversion rate ratio for the publisher, and (ii) the mean for the conversion rate ratio for the group of the peers of the publisher (m), and wherein the weighted average is weighted based on (i) the precision value for the publisher, and (ii) the precision value for the group of peers of the publisher; and communicating the modified estimate value for the conversion rate ratio for the publisher to one or more advertisers.

18. The computer system of claim 17, wherein the mean (m') of the estimate value for the publisher is a first mean of a first ratio, and wherein the mean (m) of the estimate value for the group of peers of the publisher is a second mean of a second ratio.

19. The computer system of claim 18, wherein generating the modified standard deviation (s") comprises using a standard deviation (s') of the first mean of the first ratio and a standard deviation (s) of the second mean of a second ratio.

* * * * *